Oct. 14, 1969    G. HERR    3,471,979
MOLDING STRIPS FOR VEHICLE BODIES
Filed May 16, 1968
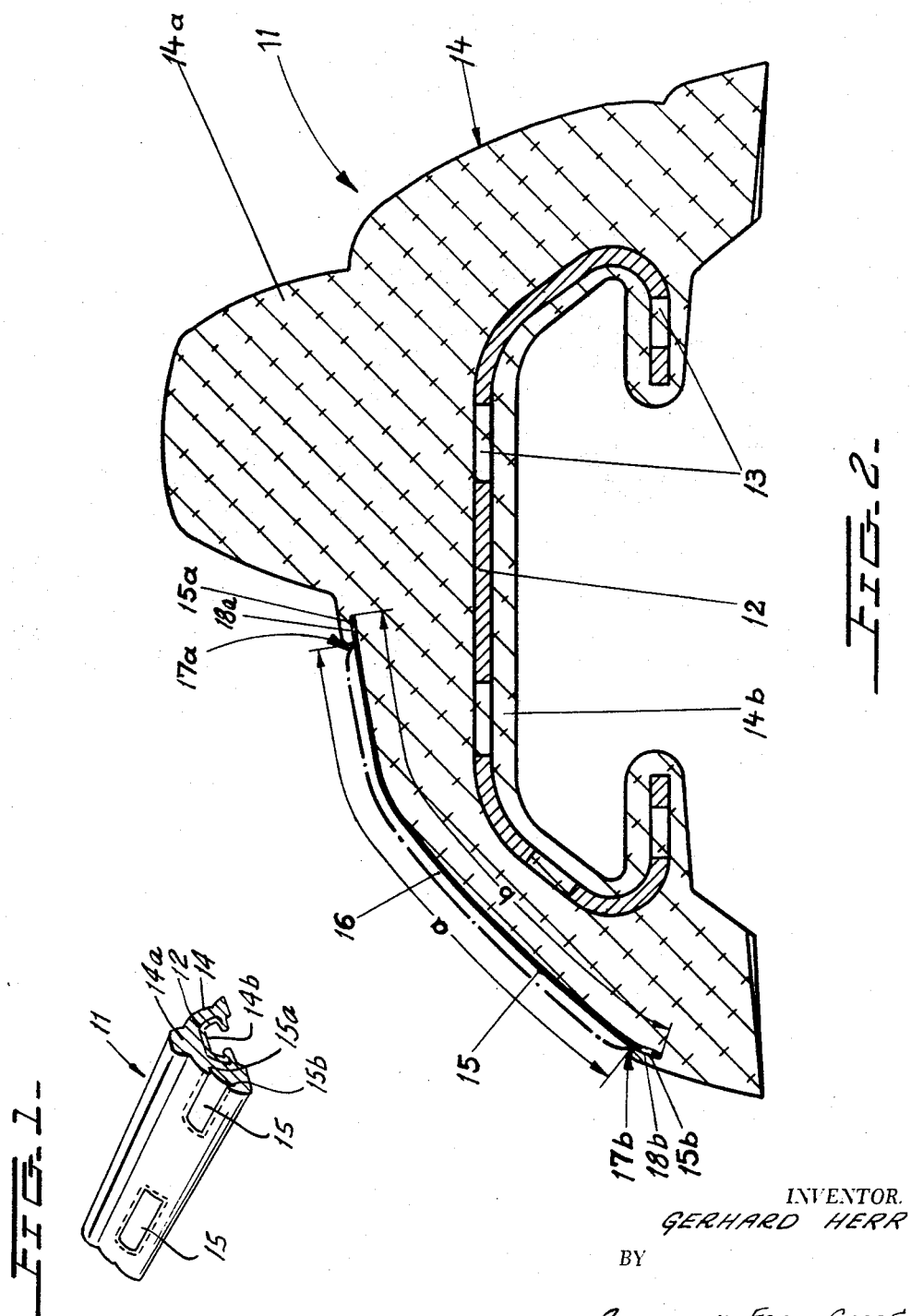
INVENTOR.
GERHARD HERR
BY
OSTROLENK, FABER, GERB & SOFFEN
ATTORNEYS United States Patent Office 3,471,979
Patented Oct. 14, 1969

3,471,979
MOLDING STRIPS FOR VEHICLE BODIES
Gerhard Herr, Wuppertal-Vohwinkel, Germany, assignor to Gebr. Happich G.m.b.H., Wuppertal-Elberfeld, Germany, a corporation of Germany
Filed May 16, 1968, Ser. No. 729,756
Claim priority, application Germany, Dec. 21, 1967,
H 64,837
Int. Cl. B60r 13/04
U.S. Cl. 52—100                    3 Claims

ABSTRACT OF THE DISCLOSURE

A molding strip for automobile bodies is provided having a support or carrier covered by a plastic or other elastically resilient material and having one or more ornamental strips embedded in the resilient material. The ornamental strips extend along the longitudinal length of the molding strip and they may be as long as the molding strip or shorter by any predetermined amount. The resilient material has indented lines adjacent the perimeters of the ornamental strips whereby the resilient material may be peeled off to expose only the ornamental strips.

---

This invention relates to molding strips for automobile bodies and is more particularly concerned with the provision of ornamental molding strips prefabricated with protective coverings for ornamental surfaces which coverings may be peeled off upon the application of the molding strip to an automobile body.

Molding strips having ornamental surfaces have found wide use in the automobile industry. The molding strips generally consist of elongated strips of metal having ornamental or shiny surfaces which are attached to the body of an automobile. These molding strips are frequently manufactured at places distant from where they are to be assembled on automobiles. For this reason, it has been found necessary to produce the molding strips with some kind of protective covering to ensure against damage to the ornamental surfaces during transit of the molding strips.

Previous molding strips have been manufactured having a support or carrier made of ornamental metal covered with plastic by means of an extruder. These molding strips were provided with indented lines in the regions where it was desired to remove the plastic cover and expose the underlying ornamental surface. The remainder of the plastic cover and the underlying support or carrier served the functions of providing adequate sealing and of providing means for fastening molding strips to the automobile body. In these connections, reference is made to copending applications Ser. No. 709,984, filed Mar. 4, 1968 entitled "Fastening Element for Molding Strips," and Ser. No. 710,210, filed Mar. 4, 1968 entitled "Molding Strip for Automobile Bodies," both applications having been filed by Gerhard Herr and Willy O. Treber and assigned to the assignee of the instant invention.

While the previous molding strips accomplish the purpose of providing protective covering for ornamental surfaces of the molding strip during transit of such strip and of providing these protective coverings so that they were easily removable, these molding strips were expensive to manufacture because the ornamental metal which was used as the carrier or support was relatively expensive and it was necessary for this ornamental metal carrier to extend the entire length of the molding strip even though only portions of the carrier surface were visible. The present invention substantially reduces the cost of these molding strips by making more economical use of the more valuable metal and at the same time substantially increases the strength of the molding strip. That is, the present invention enables use of the more valuable ornamental metals only in places where the metal is to be visible by permitting the use of ornamental metal strips shorter than the length of the molding strip.

In one preferred embodiment of the instant invention a support or carrier of any suitable material is covered with a plastic, rubber, or other elastically resilient material having imbedded therein one or more ornamental strips which may or may not run the entire length of the molding strip, as desired. The covering has indentations adjacent the perimeters of the ornamental strips whereby the covering may be peeled off by hand without the use of a tool to expose the ornamental strips. Since the ornamental strips are only placed in desired locations where they will be exposed, there is an economical savings over the previous molding strips which required the relatively expensive material substantially along its entire length and substantially across its entire width. The indentations in the plastic material adjacent the perimeter of the ornamental strips are provided so that when the protective covering is removed, the cover still overlaps the edges of the ornamental strips thereby holding them securely to the molding strip.

It is, therefore, the primary object of the present invention to produce a molding strip which is simple, economical and suitable for mass production.

It is a further object of the instant invention to provide a molding strip employing ornamental metal substantially only along areas of the molding strip which are the have these ornamental metals exposed.

An additional object of the instant invention is to provide a molding strip having great stability and strength.

The above objects, features and advantages of the instant invention along with other objects, features and advantages will become apparent upon a reading of the following description of a preferred embodiment of the instant invention in conjunction with the drawing, as follows:

FIG. 1 shows a partial perspective view of a molding strip of the instant invention;

FIG. 2 shows an enlarged cross-sectional view transverse to the longitudinal length of a molding strip of the instant invention.

Referring to the drawings there is shown a molding strip 11 comprising a support or carrier 12 surrounded by a cover 14. The support or carrier 12 is of a material capable of imparting stability to the entire molding strip. It is not necessary that the surface of this material be treated in any way for ornamental purposes. The covering 14 is plastic, rubber or another elastically resilient material.

The covering 14 consists of an outer portion 14a and inner portion 14b. These two portions are integral to each other and secure the carrier 12 as a result of the perforations 13 provided in the carrier 12. When the cover 14 is extruded onto the carrier 12, the elastically resilient material flows through the perforations 13, thereby anchoring the carrier 12 to the outer cover 14a and the inner cover 14b.

Ornamental strips 15 are embedded in the outer cover portion 14a of the molding strip 11. The ornamental strips 15 may be stainless steel, metallized plastic or other ornamental material. The ornamental strips 15 run along the longitudinal direction of the molding strip 11, and they may run the entire length of the molding strip 11 or they may be shorter such as shown in FIG. 1. The ornamental strips 15 are embedded in the outer covering 14a during the extrusion process and they are covered on all sides by the material of the covering 14. This covering of the ornamental strips 15 constitutes the protective cover for the ornamental surface and is designated as cover layer 16.

The cover layer 16 is limited by two indented lines 17a and 17b as shown in FIG. 2, which also run along the longitudinal length of the molding strip 11. It should be understood that the indented lines may define the geometric shape which the exposed ornamental surface is to have. The two lines 17a and 17b are separated by a distance "a" which is less than the width "b" of the ornamental strip 15. As a result, the edges 15a and 15b of the ornamental strip 15 remain covered by the outer covering 14a. Thereby the ornamental strip 15 is held in fixed position on molding strip 11. It is noted that the edges 15a and 15b of the ornamental strip 15 can be provided with perforations as shown at 18a and 18b extending in the longitudinal direction of the ornamental strip 15, thereby enhancing the anchoring of the ornamental strip 15 to the outer covering 14a.

It should be apparent that the ornamental strip 15 may be embedded at any location along the longitudinal length of the molding strip 11 at which the ornamental effect is desired. The ornamental strip 15 may be as long or as short as desired and need not extend along the entire length of the molding strip 11.

The outer covering 14a may be shaped to any desired form which will suitably provide the technical and esthetic requirements made on molding strip 11.

It should be clear from the above description of the instant invention that a new and novel molding strip has been provided having the benefit of being highly economical, easy to manufacture and very durable.

While the instant invention is described with respect to one preferred embodiment thereof, many modifications and variations will now become apparent to those skilled in the art.

The embodiments of the invention in which an exclusive privilege or property is claimed are defined as follows.

1. A molding strip for automobile bodies consisting of:
   support means extending along the longitudinal length of the molding strip;
   covering means of elastically resilient material surrounding said support means;
   ornamental strip means embedded in said covering means in the longitudinal direction of said molding strip;
   said covering means including a top layer covering said ornamental strip means and having indentations adjacent the perimeter of said ornamental strip means whereby said top layer may be peeled off exposing substantially all of said ornamental strip means.

2. A molding strip as set forth in claim 1 wherein the area defined by said indentation is less than the area of said ornamental strip means whereby covering means overlaps the edges of said ornamental strip means when said top layer is peeled off.

3. A molding strip as set forth in claim 2 wherein said ornamental strip means is provided with perforations adjacent its edges for anchoring said ornamental strip means in said covering means.

References Cited

UNITED STATES PATENTS

| | | | |
|---|---|---|---|
| 2,628,144 | 2/1953 | Loetscher | 156—248 X |
| 3,138,834 | 6/1964 | Shanok et al. | 52—716 X |
| 3,342,447 | 9/1967 | Marsh | 52—403 X |

FOREIGN PATENTS

| | | |
|---|---|---|
| 377,143 | 7/1932 | Great Britain. |
| 420,250 | 11/1934 | Great Britain. |

OTHER REFERENCES

Modern Plastics, vol. 31, No. 1, TP 986.AIM6, pages 98 and 99, September 1953.

ALFRED C. PERHAM, Primary Examiner

U.S. Cl. X.R.

52—173, 716